United States Patent [19]
Smith et al.

[11] Patent Number: 5,262,494
[45] Date of Patent: Nov. 16, 1993

[54] HARD, FLEXIBLE, AND DURABLE ARCHITECTURAL COATING

[75] Inventors: Marc L. Smith, Highland; Edward J. Holzrichter, Redlands, both of Calif.; Ronald J. Lewarchik, Sleepy Hollow, Ill.

[73] Assignee: Morton Coatings, Inc., Chicago, Ill.

[21] Appl. No.: 813,221

[22] Filed: Dec. 23, 1991

[51] Int. Cl.$^5$ .................... C08F 20/08; C08L 61/20
[52] U.S. Cl. .................... 525/443; 525/519; 428/458
[58] Field of Search .............. 525/443, 519; 428/344, 428/458

[56] References Cited

U.S. PATENT DOCUMENTS

| | | | |
|---|---|---|---|
| 2,891,930 | 6/1959 | Caldwell et al. | 260/75 |
| 2,901,466 | 8/1959 | Kibler et al. | 260/75 |
| 3,033,822 | 5/1962 | Kibler et al. | 260/47 |
| 3,668,275 | 6/1972 | Reimhofer et al. | 260/850 |
| 3,668,276 | 6/1972 | Riemhofer et al. | 260/850 |
| 3,691,258 | 9/1972 | Riemhofer et al. | 525/443 |
| 3,974,115 | 8/1976 | Iaganis | 525/30 |

*Primary Examiner*—James J. Seidleck
*Assistant Examiner*—W. R. H. Clark
*Attorney, Agent, or Firm*—Robert M. Didrick; Gerald K. White

[57] ABSTRACT

A low cost, high performance coating for sheet metal which is to be formed into siding for houses and automobile panels is made from a polyester prepared by the condensation of hexahydrophthalic acid and a mixture of 1,4-cyclohexanedimethanol and an acyclic polyol wherein the mole percent of acyclic polyol is from 50 to 60; and a crosslinking agent containing the —N—CH$_2$—OR moiety wherein R is hydrogen or an alkyl group having from 1 to 4 carbon atoms and the unsatisfied valence is attached to an organic group capable of incorporation into a film.

4 Claims, No Drawings

HARD, FLEXIBLE, AND DURABLE ARCHITECTURAL COATING

BACKGROUND OF THE INVENTION

This invention relates to coating compositions comprising a crosslinking agent containing N-methylol and/or N-methylol ether groups and linear polyesters having free hydroxyl groups and free carboxylic groups made from a cyclo- aliphatic dicarboxylic acid and a mixture of cycloaliphatic and acyclic polyols in which the latter predominate. It relates more particularly to coatings which because of their superior flexibility, hardness, and weatherability are especially useful on architectural siding and on automobiles.

Coatings said to have the somewhat mutually antagonistic properties of a high degree of elasticity and a high degree of hardness, as well as high gloss and resistance to weathering are taught in U.S. Pat. No. 3,668,275. These coatings are made from linear polyesters wherein at least 70 and preferably 80 mole percent of the dihydric alcohol moiety is derived from 1,4-bis-(hydroxymethyl)-cyclohexane and as much as 91 mole percent, preferably at least 50 mole percent, of the dicarboxylic acid moiety is derived from an aromatic or cycloaliphatic dicarboxylic acid. A preference for aromatic acids is shown in the working examples of the polyester and coatings therefrom.

In U.S. Pat. No. 2,901,466, Eastman Kodak Company discloses highly polymeric linear polyesters which because of their surprisingly high melting points are especially advantageous in the formation of fibers and films. Such polyesters are prepared by condensing 1,4-bis-(hydroxymethyl) cyclohexane, also known as 1,4-cyclohexane dimethanol or CHDM, with a hexacarbocyclic dicarboxylic acid. The highest melting polyesters are preferably prepared from a diol composition containing at least 50 mole percent of the CHDM and up to 50 mole percent of another diol and an acid composition containing at least 50 mole percent of a hexacarbocyclic dicarboxylic compound and up to about 50 mole percent of another bifunctional dicarboxylic compound.

State of the art architectural coatings, however, still rely on silicone protected polyester backbones to boost their exterior durability to acceptable levels. Such state of the art coatings, however, are characterized by high cost, poor hardness and poor flexibility.

SUMMARY OF THE INVENTION

It is an object of this invention, therefore, to provide a low cost, high performance coating for metal substrates which are subjected to sharp bending operations, such as architectural siding and sheet metal for automobiles, and then must withstand prolonged exposure to strong ultraviolet light.

It is a related object of this invention to provide such a coating wherein at least half of the polyol moiety of the polyester backbone is derived from an acyclic polyol.

It is another object of this invention to provide a coating which because of its excellent hardness and formability is particularly adapted to the coil coating technique.

These and other objects which will become apparent from the following disclosure are attained by a coating composition consisting essentially of:

a polyester prepared by the condensation of hexahydrophthalic acid and a mixture of 1,4-cyclohexanedimethanol and an acyclic polyol wherein the mole percent of the acyclic polyol is from 50 to 60; and a crosslinking agent containing the $-N-CH_2-OR$ moiety wherein R is hydrogen or an alkyl group having from 1 to 4 carbon atoms and the unsatisfied valence is attached to an organic group capable of incorporation into a film.

DETAILED DESCRIPTION OF THE INVENTION

The hexahydrophthalic acid may be the 1,2-, 1,3- or 1,4-isomer. The 1,4-isomer is often called 1,4-cyclohexanedicarboxylic acid. In place of the free dicarboxylic acid, the esters thereof with short chain alkanols, e.g., dimethyl, diethyl, or dipropyl esters, can also be employed. Hexahydrophthalic anhydride is preferable in many instances. Also contemplated as the acid in the condensation reaction are the alkyl hexahydrophthalic acids and anhydrides wherein an alkyl group having up to about seven carbon atoms is bound to the cycloaliphatic ring. For the purposes of this invention, therefore, the term hexahydrophthalic acid shall include in its meaning the esters, the anhydride, and the ring-alkylated derivatives of each.

Suitable acyclic polyols are exemplified by 1,6-hexanediol; pentaerythritol; trimethylolpropane; 2-methyl-1,3-propanediol; neopentyl glycol; 2-butyl-2-ethyl-1,3-propanediol; ethylene glycol; 1,4-butanediol; 1,3-butanediol; 1,5-pentanediol; and trimethylolethane. The polyols having more than two hydroxy groups are used to provide a branched structure which imparts some degree of chemical resistance, durability and stain resistance, depending on the relative amounts used, but at the expense of flexibility and solution viscosity. Whereas the total amount of acyclic polyols is, as aforesaid, 50 mole percent or more of the polyol mixture, the portion having more than two hydroxy groups is suitably from about 4 to about 20 mole percent of the acyclic total. It is preferred to use from about 5 to about 15 mole percent of tri- or tetrahydric alcohols in the polyol mixture.

The N-methylol- and N-methylol ether groups represented by the $-N-CH_2-OR$ formula given above are found in the polymers and oligomers commonly known as aminoplasts and are the reaction products of aldehydes, particularly formaldehyde, with amino-or amido-group-carrying substances exemplified by melamine, urea, dicyanodiamide, and benzoguanamine. Other polymers having such groups may be obtained following the methods described in U.S. Pat. No. 2,940,944 and German patent applications 1,060,596; 1,083,548; and 1,089,549. Especially advantageous are the aminoplasts which are modified with alkanols having from one to four carbon atoms. It is preferable in many instances to employ precursors of aminoplasts such as hexamethylol melamine, dimethylol urea, hexamethoxymethyl melamine, and the etherified forms of the others, all of which are represented by the formula given above. Thus a wide variety of commercially available aminoplasts and their precursors can be used for combining with the linear polyesters of this invention. Particularly preferred are the amino crosslinking agents sold by American Cyanamid under the trademark Cymel. In particular, the Cymel 301, Cymel 303, and Cymel 385 alkylated melamine-formaldehyde resins are useful. Of course, it is possible to use mixtures of all of the above N-methylol products.

The amine-aldehyde materials function as a crosslinking agent in the composition by reacting with the hydroxyl functionality of the polyester. In order to achieve the outstanding properties which make these coatings particularly useful, it is essential that the amount of crosslinking agent be sufficient to substantially completely react with the hydroxyl functionality present. Therefore, the amount of crosslinking agent should be sufficient to provide from about 2 to about 12 equivalents of nitrogen crosslinking functionality for each equivalent of hydroxyl functionality in the polyester.

The linear polyesters of this invention generally have an acid number of from about 1 to about 12, preferably from about 5 to about 10, and a hydroxyl number of from about 10 to about 120, preferably from about 20 to about 50. They may be produced by any of the conventional processes at temperatures up to about 250° C. or higher. The use of a catalyst is preferred as is the passage of an inert gas through the reaction mixture to protect against discoloration and to aid in the liberation of water from the mixture as it is produced by the condensation. The esterification takes place almost quantitatively and may be monitored by determining the acid and hydroxyl numbers or by monitoring the Gardner-Holt viscosity of the product.

For producing the coating composition, the polyester and the crosslinking agent are suitably first dissolved in a conventional solvent such as toluene, xylene, butanol, butyl acetate, ethylene glycol, methyl ethyl ketone, methyl isobutyl ketone, cyclohexanone, and mixtures thereof. The weight ratio of the polyester to the aminoplast may be from 90:10 to 60:40. The binder, i.e., polyester plus crosslinker, constitutes from about 30 to about 50 percent of the composition by weight. Additives and auxiliary substances such as pigments, flow modifiers, viscosity modifiers, and other binders may be dispersed in the coating composition. A catalytic amount of a strong acid such as p-toluenesulfonic acid may be added to the composition just before it is applied to a substrate to hasten the crosslinking reaction.

The composition thus obtained may be applied to sheet metal such as is used for automobile and airplane bodies; architectural metal skins, e.g., siding and window frames; and the like by spraying, dipping, or brushing but it is particularly suited for a coil coating operation wherein the composition is wiped onto the sheet as it unwinds from a coil and then baked as the sheet travels toward an uptake coil winder. It is also contemplated for use in the so-called "plate coater", available from Alcan Aluminum, whereby the composition is extruded as a thin coating onto the sheet metal and then smoothed by a doctor blade. The baking temperature in any event may be from about 100° C. to about 300° C.

PREPARATION OF POLYESTERS

TABLE 1

| | PREPARATION F POLYESTERS | | | | | | | |
|---|---|---|---|---|---|---|---|---|
| | A | | B | | C | | D | |
| Ingredients | grams | moles | grams | moles | grams | moles | grams | moles |
| HHPA | 770.2 | 5.00 | 514.0 | 3.33 | 636.2 | 4.13 | 514.0 | 3.33 |
| NPG | 381.5 | 3.67 | 338.8 | 3.26 | 235.8 | 2.27 | 381.5 | 3.67 |
| 1,4-CHDA | 286.6 | 1.67 | 573.6 | 3.33 | — | — | 573.7 | 3.33 |
| 1,4-CHDM, 90% | 588.6 | 3.67 | 521.2 | 3.26 | 363.1 | 2.27 | 587.7 | 3.67 |
| Trimethylolethane | — | — | 65.9 | 0.55 | — | — | — | — |
| Butylstannoic acid | 2.0 | | 2.0 | | 1.1 | | 2.0 | |
| | Acid Value A | | Acid Value A | | Acid Value A | | Acid Value A | |
| | 10.1 | | — | | — | | — | |
| | Viscosity A | | Viscosity A | | Viscocity A | | Viscosity A | |
| | H | | P | | G-H | | L+ | |
| Aromatic Naptha | 915.5 | | 915.5 | | 640.0 | | 1066.7 | |
| Xylene | 52.1 | | 52.1 | | 40.0 | | 66.7 | |
| Isobutyl alcohol | 171.1 | | 171.1 | | 120.00 | | 200.0 | |
| Solids (% wt) | 61.0 | | 61.0 | | 60.5 | | 60.6 | |
| Acid value B | 6.9 | | 8.8 | | 3.9 | | 4.6 | |
| Density | 1.059 | | 1.058 | | — | | — | |
| Viscosity B | Z1-Z2 | | Z4- | | Z1 | | Z2 | |

HHPA is hexahydrophthalic anhydride
NPG is neopentyl glycol
1,4-CHDA is 1,4-cyclohexanedicarboxylic acid
1,4-CHDM is 1,4-cyclohexane dimethanol The reactants shown in Table 1 were charged to a reactor equipped with an agitator, inert gas inlet, packed column, condenser, and thermometer. The reactor was flushed with inert gas and the reactants were heated to about 232° C. (360° F.) in about 2 hours while removing water. After an additional 3.5 hours, approximately, at 230° C., the acid value A and the Gardner Bubble viscosity A of a sample at 60% by weight solids in xylene were as shown in Table 1. After about another 20 minutes, the batch was cooled and reduced with the solvents as shown in Table 1. The solids content, acid value B, density, and viscosity B of the resulting solutions are as shown in Table 1.

The following specific embodiments are illustrative of the invention described and claimed herein. All parts are by weight unless otherwise stated.

EXAMPLES 1-4

Coating compositions 1 and 2 were made from polyester A and B, respectively, by first dispersing 118.2 parts of $TiO_2$ and 47.3 parts of $Cr_2O_3$ in 259.7 parts of the polyester solution and 38.6 parts of dipropylene glycol monomethyl ether until a Hegman reading of 7+ was obtained. Subsequently, 44.9 parts of Cymel 303, 31.7 parts of Cymel 385, 20.0 parts of dipropylene glycol monomethyl ether, 12.0 parts of 2-ethylhexanol, 12.0 parts of 1-butanol, 7.1 parts of a flow additive, and 15.9 parts of a 10% p-toluenesulfonic acid solution were added and mixed. The coating compositions were then adjusted to 25-30 seconds on a #4 Zahn cup with dipropylene glycol monomethyl ether. The coating compositions of Examples 3 and 4 were made according to this general procedure from Polyesters C and D, respectively.

The coating compositions were applied to aluminum panels and baked for 21 seconds at 560° F. (293° C.) to yield coatings having a thickness of about 0.76–0.78 mil. All four coatings had an H pencil hardness and were resistant to MEK. The coatings of Examples 1 and 2 had a 1-2T flexibility and the coatings of Examples 3 and 4 had a flexibility of 2T as measured by the ASTM D4145-83 procedure. The coated panels were each placed in a QUV cabinet and after 1000 hours of exposure to the test conditions prescribed in the ASTM G53-88 procedure the coating from Example 1 retained 46.5% of its original gloss; that from Example 2 retained 39.6%; that from Example 3 retained 31.9%; and that from Example 4 retained 37.6%. A commercial coating made from a silicone-protected polyester retained but 25% of its original gloss after 1000 hours and a coating based on a conventional orthophthalate/isophthalate polyester retained only 2% after 618 hours of exposure in the QUV test.

The subject matter claimed is:

1. A coating composition consisting essentially of a polyester prepared by the condensation of an anhydride consisting of hexahydrophthalic anhydride with a mixture of 1,4-cyclohexanedimethanol and acyclic polyol(s) wherein the mole percent of acyclic polyol is from 50 to 60; and a crosslinking agent containing the $-N-CH_2-OR$ moiety wherein R is hydrogen or an alkyl group having from one to four carbon atoms and the unsatisfied valence is attached to an organic group capable of incorporation into a film.

2. The composition of claim 1 wherein an acyclic polyol having three hydroxyl groups constitutes about eight mole percent of the polyol mixture.

3. The composition of claim 1 wherein the acyclic polyol(s) constitute(s) about 56 mole percent of the polyol mixture.

4. A sheet metal panel coated with the composition of claim 1 and heated to cure the composition.

* * * * *